(12) United States Patent
Jendritza et al.

(10) Patent No.: US 9,150,123 B2
(45) Date of Patent: Oct. 6, 2015

(54) DEVICE AND METHOD FOR ADAPTING A SITTING POSITION

(75) Inventors: Daniel J. Jendritza, Krefeld (DE); Wei Lange-Mao, Hagen (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 307 days.

(21) Appl. No.: 13/819,604

(22) PCT Filed: Sep. 1, 2011

(86) PCT No.: PCT/EP2011/065082
§ 371 (c)(1),
(2), (4) Date: May 10, 2013

(87) PCT Pub. No.: WO2012/028677
PCT Pub. Date: Mar. 8, 2012

(65) Prior Publication Data
US 2013/0218420 A1 Aug. 22, 2013

(30) Foreign Application Priority Data
Sep. 1, 2010 (DE) .......................... 10 2010 035 994

(51) Int. Cl.
*B60N 2/02* (2006.01)
*B60N 2/00* (2006.01)

(52) U.S. Cl.
CPC .............. *B60N 2/0224* (2013.01); *B60N 2/002* (2013.01); *B60N 2/02* (2013.01); *B60N 2/0232* (2013.01); *B60N 2/0276* (2013.01)

(58) Field of Classification Search
CPC .... B60N 2/0224; B60N 2/002; B60N 2/0232; B60N 2/0276; B60R 21/015; G06K 9/00369; G06K 9/00832
USPC .................................................. 701/36, 49
See application file for complete search history.

(56) References Cited

U.S. PATENT DOCUMENTS

| 4,698,571 | A | 10/1987 | Mizuta et al. |
| 5,829,782 | A * | 11/1998 | Breed et al. ................... 280/735 |
| 6,209,909 | B1 | 4/2001 | Breed |
| 8,818,647 | B2 * | 8/2014 | Breed ............................. 701/49 |
| 8,820,782 | B2 * | 9/2014 | Breed et al. ................... 280/735 |

(Continued)

FOREIGN PATENT DOCUMENTS

| DE | 102007 031 518 A1 | 1/2009 |
| JP | 08-198044 | 8/1996 |

(Continued)

OTHER PUBLICATIONS

Office Action dated Sep. 30, 2014, in corresponding Japanese application No. 2013-526467, 2 pages.

(Continued)

*Primary Examiner* — Richard Camby
(74) *Attorney, Agent, or Firm* — Foley & Lardner LLP

(57) ABSTRACT

A method and device adapt a sitting position of a vehicle occupant in a vehicle with at least one driver assistance system that includes at least one optical sensor unit, and with a vehicle seat with a drive unit for adjusting the sitting position. At least one physical parameter of a vehicle occupant and/or a hazardous situation is sensed by the optical sensor unit, and on the basis of the sensed physical parameter automatic setting and/or pre-setting of the sitting position of the vehicle seat are/is carried out.

19 Claims, 1 Drawing Sheet

(56) References Cited

U.S. PATENT DOCUMENTS

Figure 1:
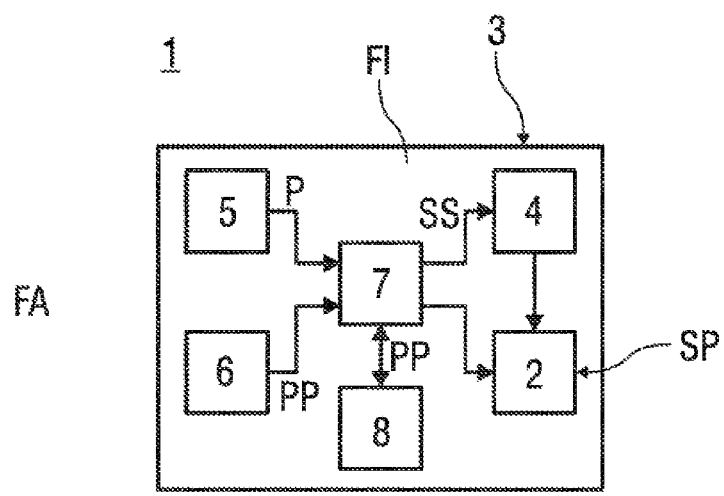

| | | |
|---|---|---|
| 8,948,442 B2 * | 2/2015 | Breed et al. .................. 382/100 |
| 2005/0131607 A1 | 6/2005 | Breed |
| 2010/0094514 A1 | 4/2010 | Ueda |

FOREIGN PATENT DOCUMENTS

| | | |
|---|---|---|
| JP | 2006-015872 | 1/2006 |
| JP | 2006-123640 | 5/2006 |
| JP | 2008-195323 | 8/2008 |
| JP | 2009-046026 | 3/2009 |
| JP | 2010-155572 | 7/2010 |
| JP | 2010-208542 | 9/2010 |
| WO | WO 02/46003 A1 | 6/2002 |
| WO | WO-2008/099270 A2 | 8/2008 |
| WO | WO-2009/138912 A2 | 11/2009 |

OTHER PUBLICATIONS

Office Action dated May 27, 2014 along with English translation in corresponding Japanese Application No. 2013-526467, 8 pgs.
International Search Report received in connection with international application No. PCT/EP2011/065082; dtd Nov. 7, 2011.

* cited by examiner

DEVICE AND METHOD FOR ADAPTING A SITTING POSITION

CROSS REFERENCE TO RELATED APPLICATIONS

The present application is a National Stage of International Application No. PCT/EP2011/065082 filed on Sep. 1, 2011, which claims the benefit of German Patent Application No. 10 2010 035 994.7 filed on Sep. 1, 2010, the entire disclosures of which are incorporated herein by reference.

The invention relates to a method for adjusting a sitting position of a vehicle occupant in a vehicle in accordance with the preamble of claim 1. In addition, the invention relates to a device for adjusting a sitting position of a vehicle occupant in a vehicle in accordance with the preamble of claim 7.

Vehicle seats are known from the prior art, which vehicle seats comprise in particular electric drive units by means of which a sitting position can be changed. In so doing, a vehicle occupant uses a control device of the drive unit in order to adjust the sitting position and in particular to change the longitudinal displacement of a sitting surface in a vehicle, a sitting height, a sitting surface inclination, a backrest inclination and/or a position of a headrest of the vehicle seat.

In addition, electrically adjustable vehicle seats are known that comprise a storage unit. Position parameters that characterize a previously adjusted sitting position can be stored by means of the storage unit and retrieved. This saves the vehicle occupant performing a repeated and frequently lengthy procedure to adjust the desired sitting position. This can save time in particular when the vehicle is regularly used by several people.

It is known to equip headrests with capacitive sensors that render it possible to automatically adjust the height.

The prior art likewise discloses so-called active headrests that are triggered in the event of a rear-end collision of the vehicle. In so doing, in the event of a rear-end collision the active headrest moves upwards and forwards in order to reduce the distance between the headrest and a head of the vehicle occupant. Consequently, the distance over which the head travels in an accelerated manner is reduced in order to avoid injury and in particular to reduce whiplash injury.

Modern vehicles are equipped with driver-assist systems that comprise a plurality of cameras and sensors. The driver-assist system assists a vehicle driver in the process of early recognition of critical and hazardous situations. For this purpose, the driver-assist system can comprise in particular a night vision system, a lane departure warning system, a collision avoidance system and/or a collision warning system. An active driver-assist system, such as the adaptive cruise control (ACC), can avoid accidents by means of automatic active intervention in the vehicle.

DE 10 2007 031 518 A1 describes a device for monitoring the exterior surroundings and/or the interior compartment of vehicles by means of a digital video display that comprises a camera by means of which the view of the vehicle exterior surroundings and/or interior compartment from at least one central point is displayed permanently or as required for a defined period of time, wherein the display is stored by means of a storage medium and/or can be transmitted to a receiver by means of a transmitting device.

U.S. Pat. No. 4,698,571 describes a device for adjusting a vehicle seat and vehicle mirrors to suit a specific occupant.

The object of the invention is to provide a device and a method that are improved with respect to the prior art for adjusting a sitting position of a vehicle occupant in a vehicle.

With respect to the method for adjusting a sitting position of a vehicle occupant in a vehicle, the object is achieved in accordance with the invention by means of the features disclosed in claim 1.

With respect to the device for adjusting a sitting position of a vehicle occupant in a vehicle, the object is achieved in accordance with the invention by means of the features disclosed in claim 7.

Advantageous embodiments of the invention are the subject matter of the subordinate claims.

In the case of the method for adjusting a sitting position of a vehicle occupant in a vehicle having at least one driver-assist system that comprises at least one optical sensor unit, and having a vehicle seat that comprises a drive unit for adjusting the sitting position, at least one physical parameter of a vehicle occupant or a hazardous situation is sensed in accordance with the invention by means of the optical sensor unit and on the basis of the sensed physical parameter a procedure of automatically adjusting and/or pre-setting the sitting position of the vehicle seat is performed.

In the case of the method for adjusting a sitting position, a potential vehicle driver or vehicle occupant is in particular optically sensed whilst still outside the vehicle by means of the first sensor unit. Physical parameters of the vehicle driver or vehicle occupant are determined from the sensed data and are transmitted to the control unit for controlling the drive unit, whereupon the sitting position of the vehicle seat is adjusted to suit the physical parameters. In so doing, it is possible to pre-set the sitting position and/or to adjust a final sitting position. The vehicle occupant can, as required, adjust the sitting position to suit his requirements in an optimum manner rapidly and comfortably by means of operating the control unit. This can result in a considerable amount of time being saved particularly when the vehicle is regularly used by several people, as occurs, for example, in the case of family vehicles or rented cars.

In accordance with a preferred embodiment of the invention, the final sitting position is adjusted automatically and is supported by means of the data that is sensed by the second sensor unit. In so doing, operating errors are avoided in an advantageous manner, so that optimum protection of the vehicle occupant is ensured.

In the case of a hazardous situation that is sensed by the first sensor unit, the sitting position of the vehicle seat is automatically moved into a safe sitting position, whereby the risk of injury to the vehicle occupant is reduced.

In a first variant, at least one physical parameter is sensed outside the vehicle as a potential vehicle occupant approaches.

In a second variant, at least one physical parameter of a vehicle occupant who is seated on the vehicle seat is sensed inside the vehicle.

The potential vehicle occupant or vehicle driver who is approaching a vehicle is sensed by the first sensor unit that is embodied, for example, as a camera, wherein physical parameters of the vehicle occupant or vehicle driver that characterize in particular a body height and the length of extremities, such as legs and arms, can be determined from the sensed data. The sitting position of the vehicle seat can be automatically adjusted on the basis of the physical parameters determined in this manner by means of controlling the drive unit of the vehicle seat, said sitting position comprising in particular a longitudinal displacement of the vehicle seat or a height adjustment and positioning of the headrest. As a consequence, a time-consuming and in particular manual procedure of adjusting the sitting position is avoided.

In accordance with a preferred and/or alternative embodiment of the invention, the device for adjusting the sitting position comprises means in order to communicate with an existing driver-assist system, such as in particular the adaptive cruise control (ACC). Consequently, when the driver-assist system recognizes a hazardous situation, the sitting position can automatically be adjusted into a safe sitting position, as a consequence of which the risk of injury to the vehicle occupant is reduced.

Preferably, a body height and a length of extremities of the vehicle occupant are sensed as physical parameters.

The pre-set sitting position of the vehicle seat can be changed or adjusted by the vehicle occupant. Preferably, the control unit renders it possible to manually adjust or finely adjust the sitting position as required.

A change or adjustment of the pre-set sitting position of the vehicle seat is controlled and/or regulated by the vehicle occupant by means of a weight displacement.

In a further preferred embodiment of the invention, the vehicle occupant who is seated on the vehicle seat controls the final adjustment of the sitting position by means of a weight displacement. Separate operating elements for controlling the sitting position are consequently not necessary and can be avoided. In addition, the operating procedure is particularly intuitive, rapid and consequently particularly comfortable owing to the fine adjustment of the sitting position for the final adjustment by means of the weight displacement.

In the case of the device for adjusting a sitting position of a vehicle occupant in a vehicle having at least one driver-assist system that comprises at least one optical sensor unit, and having a vehicle seat that comprises a drive unit for adjusting the sitting position, at least one physical parameter of a vehicle occupant or a hazardous situation can be sensed in accordance with the invention by means of the optical sensor unit and it is possible on the basis of said physical parameter to actuate a procedure of automatically adjusting and/or presetting the sitting position of the vehicle seat. The device for adjusting the sitting position thus renders it possible to automatically adjust and/or preset the sitting position to suit the physical parameters of the vehicle driver and/or of the vehicle occupant. In so doing, the automatic adjustment and/or presetting of the sitting position is performed to suit the physical parameters that are determined optically. This ensures the safety of the vehicle driver and/or of the vehicle occupant since individual errors during in particular a manual adjustment of the sitting position can be avoided.

Preferably, a vehicle exterior zone can be sensed by means of a first sensor unit.

Particularly preferably, a vehicle interior zone and/or a sitting position of the vehicle seat can be sensed by means of a second sensor unit.

The first and/or second sensor unit comprise in each case a plurality of sensors. In so doing, the first and/or second sensor unit comprise particularly preferably in each case a multi-focus optical sensor.

In an advantageous variant, the first and/or second sensor unit comprise electro-magnetic waves in the visible and/or non-visible range.

In accordance with a preferred embodiment of the invention, the first and/or second sensor unit comprise in each case a plurality of sensors and in particular optical sensors, so that the physical parameters and/or the sitting position can be sensed in a reliable manner. The first and/or second sensor unit can comprise for this purpose in particular a multi-focus optical sensor or can detect wavelengths in the infrared range, so that it is ensured that the sensing operation can be performed reliably even in conditions of poor visibility.

Preferably, an existing and in particular optical sensor of a driver-assist system is used as the first sensor unit of the device for adjusting the sitting position.

A control unit of the device is coupled advantageously to at least one driver-assist system and to the drive unit for adjusting the sitting position.

In accordance with a preferred and/or alternative embodiment of the invention, adaptive materials for adjusting the sitting position are integrated in the vehicle seat. The integrated adaptive materials comprise in particular electro- and/or magneto-rheological fluids and/or an electro- and/or magneto-rheological polymer. The mechanical characteristics of the vehicle seat can be changed by means of an electric and/or magnetic field in such a manner that said mechanical characteristics can be reversibly changed. In so doing, the mechanical characteristics of the adaptive material can be changed by means of switching on and/or off the electric and/or magnetic field in such a manner that it is possible to switch between a first state in which it is possible to change the sitting position of the vehicle seat and a second state in which the sitting position of the vehicle seat is fixed. The adaptive materials that are integrated in the vehicle seat render it possible to adjust the sitting position in a particular flexible manner and said sitting position can be comfortably fixed by means of switching on and/or off the electric and/or magnetic field.

An operating element for activating or deactivating the device is arranged in the vehicle interior zone. The control unit of the device for adjusting the sitting position comprises at least one operating element that is arranged inside the vehicle and said operating element renders it possible to activate and deactivate the automatic adjustment of the sitting position. The operating element that is arranged inside the vehicle side is used in particular as an emergency-off switch in order to prevent an unintentional automatic adjustment of the sitting position.

Figure 2:
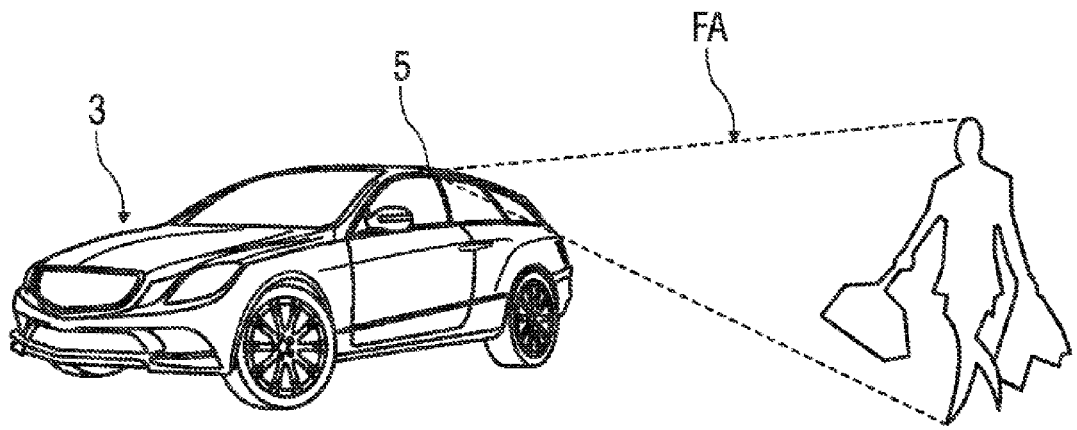

The invention is explained in detail with reference to the attached schematic figures, in which:

FIG. 1 shows a schematic illustration of components of a device for adjusting a sitting position, FIG. 2 shows a schematic illustration of a vehicle driver or a vehicle occupant in a vehicle exterior zone being sensed by means of a first sensor unit.

Mutually corresponding parts are provided with like reference numerals in all the figures.

FIG. 1 illustrates schematically the components of a device 1 for adjusting a sitting position SP of a vehicle seat 2 that is arranged in a vehicle 3.

The device 1 for adjusting the sitting position SP comprises at least one vehicle seat 2, at least one drive unit 4 for adjusting the sitting position SP of the vehicle seat 2, at least a first sensor unit 5 for determining physical parameters P of a vehicle occupant and in particular of a vehicle driver, at least a second sensor unit 6 for determining the sitting position SP of the vehicle seat 2 and at least one control unit 7 for controlling the drive unit 4.

The first and the second sensor unit 5,6 comprise preferably in each case a plurality of sensors that are embodied as optical sensing units, such as cameras. In so doing, infrared cameras, CCD cameras and/or conventional optical cameras, for example, can be used and if necessary replace capacitive sensors.

Alternatively or in addition thereto, the sensors of the first and second sensor unit 5,6 are embodied as bionic sensors, capacitive sensors or ultrasound sensors.

In a preferred exemplary embodiment of the invention, sensors that are already provided in the vehicle 3 are used as the first and/or second sensor unit 5,6 of the device 1 for adjusting the sitting position SP. The sensors that are already provided can be, for example, part of an existing driver-assist system or of an existing anti-theft system.

A vehicle exterior zone FA that surrounds the vehicle 3 can be sensed at least in parts by means of the first sensor unit 5. For this purpose, the sensors of the first sensor unit 5 are arranged on the exterior of the vehicle or in the interior of the vehicle, for example on a vehicle exterior mirror, on an A or B column of the vehicle 3, on a vehicle door cladding, on a roof console and/or on a roof lining of the vehicle 3.

The potential vehicle occupant in particular the potential vehicle driver who is approaching the vehicle 3 can be sensed by means of the first sensor unit 5 whilst still in the vehicle exterior zone. Physical parameters P, for example, a body height and/or the length of extremities, in particular the length of legs and arms, of the vehicle occupant and/or vehicle driver can be determined from the data that is sensed by the first sensor unit 5.

FIG. 2 shows a schematic illustration of the potential vehicle occupant and/or the potential vehicle driver in the vehicle exterior zone FA being sensed by means of the first sensor unit 5.

In accordance with a preferred embodiment of the invention, the first sensor unit 5 is arranged and/or positioned in such a manner that the data for determining the physical parameters P can be sensed as the vehicle door is opened.

As an alternative thereto, the first sensor unit 5 can be arranged and/or positioned in such a manner that a vehicle interior zone FI can be sensed at least in parts. The physical parameters P are determined in the case of this alternative exemplary embodiment only after the vehicle driver and/or the vehicle occupant has entered the vehicle 3.

The physical parameters P can be supplied to the control unit 7 for controlling the drive unit 4, wherein the drive unit 4 receives a corresponding control signal SS from the control unit 7. The sitting position SP of the vehicle seat 2 can be adjusted automatically by means of the drive unit 4 into a sitting position that is preset according to the physical parameters P. For this purpose, in particular a length adjustment, a seat height, a seat inclination, a back-rest inclination of the vehicle seat 2, a height adjustment and/or a position of a headrest of the vehicle seat 2 can be changed.

Position parameters PP that comprise in particular the dimensions of a vehicle interior space that is available for adjusting the sitting position SP are to be taken into consideration when automatically presetting the sitting position SP to the physical parameters P. These position parameters PP can be stored in a storage unit 8 that is illustrated schematically in FIG. 1 and retrieved by the control unit 7 in order to adjust the sitting position SP.

As an alternative or in addition thereto, the position parameters PP can be sensed by a second sensor unit 6 that is arranged inside the vehicle. In so doing the position parameters PP include in particular a parameter relating to the seat occupancy of the vehicle 3. For this purpose, a capacitive sensor of the second sensor unit 6 for example is integrated in the vehicle seat 2 and can be used to establish whether a vehicle occupant is seated on the vehicle seat 2.

If the vehicle seat 2 is occupied, the control unit 7 receives a position parameter PP to that effect, whereuponupon the automatic adjustment of the sitting position SP from the vehicle exterior zone FA is prevented from activating.

The second sensor unit 6 is attached inside the vehicle and senses at least in parts the vehicle interior zone FI. The second sensor unit 6 is used essentially to sense the particular pre-set sitting position SP of the vehicle seat 2, wherein the position parameters PP can be determined, said position parameters characterizing the position of the vehicle seat 2 in the vehicle and relative to the vehicle occupant seated on the vehicle seat 2.

In so doing, it is possible to sense as position parameters PP, for example, a distance between the roof lining of the vehicle 3 and the head of the vehicle occupant, a distance between a knee of the vehicle occupant and a foot space of the vehicle 3, a distance of a foot of the vehicle driver from an accelerator pedal, a height of the headrest of the vehicle seat 2 in comparison to the head of the vehicle occupant, a position of a hip of the vehicle occupant (H-point), an angle of inclination of a torso of the vehicle occupant and/or an elbow angle of a vehicle occupant whose hand is in contact with a steering wheel.

In a preferred exemplary embodiment, an optical sensor that is embodied as a camera and is part of the first and/or second sensor unit 5,6 is used in addition as a parking aid, for recognizing signs, as part of an authorization and/or identification system of the vehicle driver, for monitoring a sitting position SP of the vehicle occupant, for monitoring a state of a vehicle occupant, in particular of a child, for receiving video telephone conference calls and/or in order to receive videos, films and/or images.

The position parameters PP can be supplied to the control unit 7, so that it is possible to finely adjust the sitting position SP and to perform the final automatic adjustment of the sitting position SP. By sensing the position parameters PP, the parts that are arranged inside the vehicle are prevented in particular from colliding when adjusting the sitting position SP.

In order to adjust the sitting position SP and in particular the positioning of the headrest of the vehicle seat 2, the drive unit 4 can comprise an electro-mechanical motor, a dielectric elastomer actuator and/or a bionic drive.

In a preferred exemplary embodiment of the invention already existing electric drive units that are integrated in the vehicle seat 2 for adjusting the seat are used to initiate the automatic adjustment of the sitting position SP.

The control unit 7 comprises an operating interface having a plurality of operating elements that enable the vehicle occupant and/or the vehicle driver to control the device 1 for adjusting the sitting position SP. In so doing, the operating elements can be arranged in the vehicle interior zone FI. Alternatively or in addition thereto, operating elements are provided, which operating elements render it possible to control the device 1 for adjusting the sitting position SP from the vehicle exterior zone FA.

In an exemplary embodiment of the invention, a remote control for locking a door of the vehicle 3 comprises an operating element, by means of which operating element the automatic adjustment of the sitting position SP can be activated and deactivated.

The operating interface can comprise an identification device, by means of which the vehicle driver can be identified. For this purpose, a sensing unit, for example, is provided, by means of which sensing unit characteristic features of the vehicle driver, such as a finger print or features of the face of the vehicle driver can be sensed. The operating interface cannot be used if a vehicle driver is not identified or if the identification is incorrect. An anti-theft system that is provided in the vehicle 3 is used for identification purposes in a preferred exemplary embodiment of the invention.

For this purpose, the vehicle seat 2 can comprise, for example, operating elements that are arranged inside the vehicle and that render it possible, for example, to directly adjust the sitting position SP manually. Alternatively or in addition thereto, operating elements are provided for controlling the drive unit 4.

In a preferred exemplary embodiment of the invention, the operating interface comprises a plurality of pressure sensors that are integrated in the vehicle seat 2 and are embodied in particular as capacitive sensors. It is possible by means of the pressure sensors to sense a weight displacement of the vehicle occupant who is seated on the vehicle seat 2. This sensed weight displacement renders it possible to make a fine adjustment for finally adjusting the sitting position SP. For this purpose, the drive unit 4 can be controlled by means of corresponding control signals SS.

In this exemplary embodiment, the conventional operating elements for controlling the sitting position SP can be replaced by the pressure sensors that are integrated in the vehicle seat 2. The pressure sensors function as a haptic operating interface in which the vehicle occupant exerts pressure on the vehicle seat in order to achieve the final adjustment of the sitting position SP, in that the vehicle occupant displaces his body in the direction of the desired adjustment of the sitting position.

In addition, so-called adaptive materials can be integrated in the vehicle seat 2, such as electro- and/or magneto-rheological fluids and/or polymers, whose characteristics can be changed by means of applying an electric and/or magnetic field. In so doing, in particular mechanical characteristics, such as strength, elasticity or viscosity, can be reversibly changed. These adaptive materials that are integrated in the vehicle seat 2 are used in such a manner that it is possible to switch between two states by means of switching an electric and/or magnetic field on and/or off, wherein a first state allows the sitting position SP of the vehicle seat 2 to be changed and a second state fixes the sitting position SP.

The operating interface comprises at least one operating element that is arranged inside the vehicle and that is embodied, for example, as a push-button. The automatic adjustment of the sitting position SP is deactivated and/or activated by operating the push-button and said push-button is used in particular as an emergency-off switch for the device 1, said push-button being arranged at a site that can be easily reached by the vehicle driver, for example, on the vehicle seat 2, on a door cladding, on a floor console and/or on an instrument panel of the vehicle 3. The operating element that is used as an emergency-off switch can also be integrated in a console for controlling the sitting position SP.

In so doing, the automatic adjustment of the sitting position SP can be terminated by the vehicle driver operating the emergency-off switch at any time in order to avoid collisions or if only limited movement of the vehicle seat 2 or of the headrest for adjusting the sitting position SP is possible.

Following an adjustment of the sitting position SP, the position parameters PP that characterize the adjusted sitting position SP are stored in the storage unit 8. Following an adjustment of the sitting position SP, the vehicle seat can be moved into the previously adjusted sitting position SP by means of retrieving the position parameter PP.

In accordance with a preferred exemplary embodiment of the invention, the device 1 for adjusting the sitting position SP comprises a display unit that is arranged in particular on a central console, on a windscreen and/or on a head-up-display (HUD) of the vehicle 3. The sitting position SP that comprises in particular the position of the headrest can be displayed visually by means of the display unit. A warning signal is emitted visually and/or acoustically by means of the display unit in order to warn the vehicle occupant and in particular the vehicle driver of a hazardous situation if the sitting position SP is incorrect or has not been sufficiently adjusted. Alternatively or in addition thereto, the display unit is integrated in a visual display unit, in a so-called head-mounted-display (HMD), that is worn separately on the head.

In a further preferred exemplary embodiment of the invention, the device 1 for adjusting the sitting position SP communicates with an existing driver-assist system, for example an adaptive cruise control (ACC). In the event of a hazardous situation being recognized by the driver-assist system, the sitting position SP can consequently be automatically adjusted into a safe sitting position.

In the case of a method for adjusting a sitting position, physical parameters P of a potential vehicle driver or vehicle occupant who is located in the vehicle exterior zone FA are determined by means of a first sensor unit 5. The vehicle seat 2 is pre-set to the sitting position SP that is adjusted to suit the physical parameter P.

Once the vehicle driver or vehicle occupant is seated on the vehicle seat 2, position parameters PP are determined by means of a second sensor unit 6 and said position parameters render it possible to finely adjust the sitting position SP and to finally adjust the sitting position.

In accordance with a possible embodiment of the invention, the vehicle driver and/or the vehicle occupant controls the final adjustment of the sitting position SP by means of displacing his body weight on the vehicle seat 2.

Once the sitting position SP has been finally adjusted, the device 1 deactivates the adjustment of the sitting position SP and fixes the sitting position SP.

In accordance with a further possible exemplary embodiment, a hazardous situation is recognized by means of an existing driver-assist system, whereupon the sitting position SP is adjusted. Thus, for example, the distance between the headrest of the vehicle seat 2 and the head of the vehicle occupant is reduced in order to avoid whiplash injury in the event of a rear-end collision being recognized.

LIST OF REFERENCE NUMERALS

1 Device for adjusting a sitting position
2 Vehicle seat
3 Vehicle
4 Drive unit
5 First sensor unit
6 Second sensor unit
7 Control unit
8 Storage device
FI Vehicle interior zone
FA Vehicle exterior zone
SP Sitting position
SS Control signal
P Physical parameter
PP Position parameter

The invention claimed is:

1. A method for adjusting a sitting position of a vehicle occupant in a vehicle having at least one driver-assist system that comprises at least one optical sensor unit and having a vehicle seat that comprises a drive unit for adjusting the sitting position, the method comprising:
   sensing, via the optical sensor unit, at least one physical parameter of a vehicle occupant and/or a hazardous situation outside the vehicle as a potential vehicle occupant approaches; and
   performing, on the basis of the sensed physical parameter, a procedure of automatically adjusting and/or pre-setting the sitting position of the vehicle seat.

2. The method as claimed in claim 1, wherein at least one physical parameter of a vehicle occupant that is seated on the vehicle seat is sensed inside the vehicle.

3. The method as claimed in claim 1, wherein a body height and a length of the extremities of the vehicle occupant are sensed as physical parameters.

4. The method as claimed in claim 1, wherein the pre-set sitting position of the vehicle seat is changed or adjusted by the vehicle occupant.

5. The method as claimed in claim 4, wherein a change or adjustment of the pre-set sitting position of the vehicle seat is controlled and/or regulated by the vehicle occupant via a weight displacement.

6. A device for adjusting a sitting position of a vehicle occupant in a vehicle having at least one driver-assist system that comprises at least one optical sensor unit and having a vehicle seat that comprises a drive unit for adjusting the sitting position, the device comprising:
   a control unit that causes actuation of the drive unit to automatically adjust and/or pre-set the sitting position of the vehicle seat, based on at least one physical parameter of a vehicle occupant and/or a hazardous situation sensed by the optical sensor unit as a potential vehicle occupant approaches.

7. The device as claimed in claim 6, wherein a vehicle exterior zone can be sensed by a first sensor unit.

8. The device as claimed in claim 7, wherein a vehicle interior zone and/or a sitting position of the vehicle seat can be sensed by a second sensor unit.

9. The device as claimed in claim 8, wherein the first and/or second sensor unit comprise in each case a plurality of sensors.

10. The device as claimed in claim 9, wherein the first and/or second sensor unit comprise in each case a multi-focus optical sensor.

11. The device as claimed in claim 8, wherein the first and/or second sensor unit comprise electro-magnetic waves in the visible and/or non-visible range.

12. The device as claimed in claim 6, wherein a control unit is coupled to at least one driver-assist system and to the drive unit for adjusting the sitting position.

13. The device as claimed in claim 6, wherein adaptive materials for adjusting the sitting position are integrated in the vehicle seat.

14. The device as claimed in claim 6, wherein an operating element for activating or deactivating the device is arranged in a vehicle interior zone.

15. The method as claimed in claim 1, further including sensing the potential vehicle occupant as the potential vehicle occupant approaches and identifying a body height and an extremity length of the potential vehicle occupant based on information from the optical sensor unit, wherein the vehicle seat is automatically adjusted based on the physical parameters of the body height and the extremity length.

16. The method as claimed in claim 15, wherein the vehicle seat is automatically adjusted based on the physical parameters by controlling, using a controller, at least one drive unit to adjust at least one of a length wise position of the vehicle seat, a height of the vehicle seat, an inclination of the vehicle seat, a back-rest inclination of the vehicle seat, or a height of a headrest of the vehicle seat.

17. The method as claimed in claim 1, wherein the optical sensor unit is positioned to sense at least one physical parameter of the vehicle occupant as the vehicle occupant approaches the vehicle and as a vehicle door is opened.

18. The device as claimed in claim 6, wherein the control unit is configured to sense the potential vehicle occupant as the potential vehicle occupant approaches using the optical sensor unit and identify a body height and an extremity length of the potential vehicle occupant based on information from the optical sensor unit, and wherein the vehicle seat is automatically adjusted based on the physical parameters of the body height and the extremity length.

19. The device as claimed in claim 6, wherein the optical sensor unit is positioned to sense at least one physical parameter of the vehicle occupant as the vehicle occupant approaches the vehicle and as a vehicle door is opened.

* * * * *